United States Patent
Gerdau et al.

(10) Patent No.: US 7,331,216 B2
(45) Date of Patent: Feb. 19, 2008

(54) LEAK RATE MEASURING DEVICE

(75) Inventors: Ludolf Gerdau, Elsdorf (DE); Randolf Rolff, Kerpen-Horrem (DE); Ralf Kilian, Köln (DE)

(73) Assignee: Inficon GmbH, Cologne (DE)

( * ) Notice: Subject to any disclaimer, the term of this patent is extended or adjusted under 35 U.S.C. 154(b) by 50 days.

(21) Appl. No.: 10/558,164

(22) PCT Filed: May 10, 2004

(86) PCT No.: PCT/EP2004/004949

§ 371 (c)(1),
(2), (4) Date: Nov. 23, 2005

(87) PCT Pub. No.: WO2004/106881

PCT Pub. Date: Dec. 9, 2004

(65) Prior Publication Data

US 2006/0283235 A1 Dec. 21, 2006

(30) Foreign Application Priority Data

May 31, 2003 (DE) ............... 103 24 766

(51) Int. Cl.
*G01M 3/20* (2006.01)
(52) U.S. Cl. ........................ 73/40.7; 250/289
(58) Field of Classification Search .................... 73/40, 73/40.7; 250/289
See application file for complete search history.

(56) References Cited

U.S. PATENT DOCUMENTS 3,239,662 A * 3/1966 Noller ..................... 250/296
4,409,482 A * 10/1983 Scheid et al. ............... 250/282
5,821,404 A * 10/1998 Bohm et al. ................. 73/40.7

FOREIGN PATENT DOCUMENTS

| JP | 2-309226 | 12/1990 |
| JP | 2000-046680 | 2/2000 |
| JP | 2000046680 A * | 2/2000 |

OTHER PUBLICATIONS

"What is a lock in Amplifier?" 2000, PerkinElmer Instruments, V2.1 04/00UK, found at http://www.cpm.uncc.edu/programs/tn1000.pdf.*

* cited by examiner

*Primary Examiner*—Daniel S. Larkin
(74) *Attorney, Agent, or Firm*—Marjama Muldoon Blasiak & Sullivan LLP

(57) ABSTRACT

A leak rate measuring device contains a strip spectrometer in which the ion path of the respective gas is influenced by at least one variable influencing quantity. When a gas having a predetermined mass is detected, and leakages of a gas having other predetermined masses interfere with this detection due to lack of selectivity of the spectrometer, the influencing quantity is modulated in a sinusoidal manner, and the wanted signal is subsequently selected in a lock-in amplifier. This modulation enables, for example, the elimination of the interfering influence of underground water during the leak rate measurement while using helium as a test gas.

6 Claims, 3 Drawing Sheets

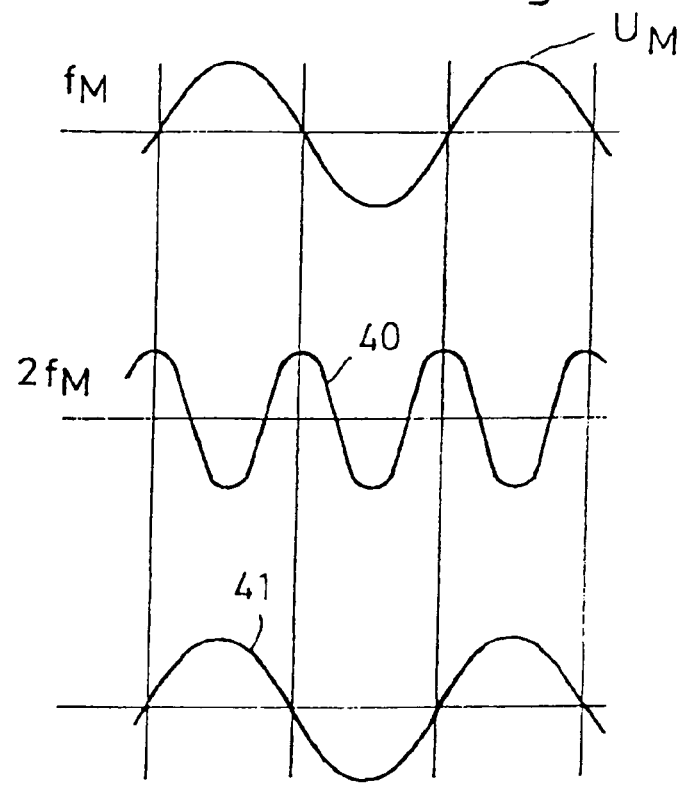
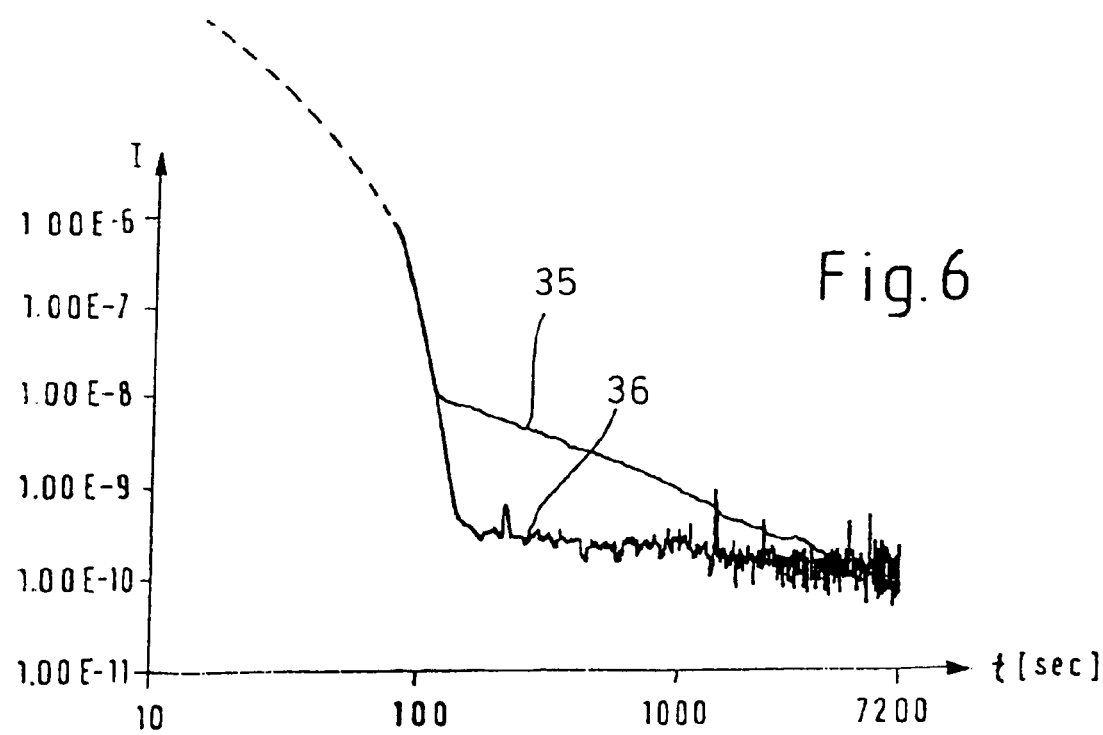

LEAK RATE MEASURING DEVICE

FIELD OF THE INVENTION

The invention relates to a method for leak rate measurement and to a leak rate measuring device comprising a vacuum pump means for pumping gas out of a container, and a strip spectrometer (e.g. a sector-field mass spectrometer) for the mass-dependent deflecting of ions of the gas by variation of an influencing quantity (e.g. the anode voltage) and for the determining of the quantity of ions impinging on an ion catcher.

BACKGROUND OF THE INVENTION

Using the vacuum method, even minimum leakage rates of a container can be reliably detected. The smaller the leakage rate is, the higher will be the demands posed on cleanliness and end vacuum. When searching for leaks in situ, the container is evacuated by use of a leak detector until the test pressure required for the leak detector has been reached. Then, suspected leak sites on the container are sprayed from outside with a fine test gas jet. Test gas entering the container will be pumped off by the vacuum pump means and be detected by a mass spectrometer. A leak rate measuring device of this type is described in the brochure "Industrielle Dichtheits-Prüfung" of Leybold-Heraus GmbH dated 1987.

The mass spectrometers used in leak rate measurement are strip spectrometers such as e.g. the sector-field mass spectrometer wherein gas ions are caused to follow a curved path and then to pass an opening arranged within a shutter so as to have the gas ions impinge on an ion catcher electrode. The latter is connected to a highly sensitive electrometer amplifier by which the very small stream of ions will be sufficiently amplified for supplying the ions to a follower amplifier. An anode is fed with a mass-specific anode voltage. This voltage will cause a specific speed of the ions. In this manner, depending on the respective value of the anode voltage, ionized particles with different specific masses can travel along the ion path and impinge on the ion catcher. By suitable selection of the anode voltage, one can determine the respective specific mass which is to be examined.

Mass spectrometers of the modulating type wherein offset and disturbance effects are suppressed by use of modulation technique are already known. These spectrometers modulate the disturbance effects in such a manner that the measurement signal is caused to change between a largest possible sensitivity and a smallest possible sensitivity. Thus, a large modulation depth is obtained, and disturbance effects can be optimally eliminated.

Various options for modulation are available, notably:
  a. acceleration voltage (in the present case, anode voltage)
  b. magnetic field
  c. direction/site of ion entrance, by use of modulated deflection voltages As a test gas for leak detection devices, frequent use is made of helium. Helium has the specific mass M4. A difference resides in the restricted selectivity of the mass spectrometer. Due to this restriction, the signal peaks of the integral specific masses, which actually should be distinct from each other, are caused to merge into each other. For instance, one component of the M3 signal will spread into the range of the M4 signal so that, if a large quantity of an M3 gas exists, a gas of the specific mass M4 (e.g. helium) cannot be measured with sufficient selectivity. In practice, this is indeed the case. On containers for leak measurement, water will deposit both on the outside and on the inside of the container. The $H_2$ component of water includes also M3 portions whose existence considerably disturbs the measurement of an M4 gas. Although one could perform the measurement under vacuum conditions long enough to allow the water components to be pumped off sufficiently, this approach would require a very long pumping period and thus cause a long time to pass until a stable indication of the leak rate is possible. The influence of the water on the measurement result is referred to as "water underground".

SUMMARY OF THE INVENTION

It is an object of the invention to provide a method for leak rate measurement and a leak rate measuring device wherein, while a selective measurement is performed in the range of the specific mass of the test gases, the influences of adjacent masses are eliminated without the need to accept overly long measurement times.

In the method described herein, the above object is achieved by the features of claim 1, and in the device described herein, by the features of claim 4.

According to the invention, the modulation is performed about the point of the highest sensitivity for the mass to be detected. By observing the individual frequency portions, an optimum separation can be effected between the current signal of the mass to be detected and the current signal of the adjacent masses. In the process, the peak (local maximum value along the mass axis) of the mass to be measured is separated from the flanks caused by adjacent masses, and from other disturbing DC variables.

In this manner, according to the invention, the wanted signal generated by the test gas is freed from disturbing signals, particularly from the slow drift of the water underground during or after the pump-off process. The influence of the M3 component on the measurement result of the M4 component is annihilated. The water underground is eliminated. Thus, even minimum quantities of helium can be detected in spite of the presence of water.

The leak rate measuring device according to the invention is distinguished in that, in a selected measurement range which corresponds to the peak of the mass spectrum occurring at a mass number, there is applied a periodically varying modulation quantity and that a filter device extracts from the generated signal a measurement signal of twice the frequency of the modulation quantity for evaluation.

In this regard, use is made of the circumstance that the peak region of the M4 curve represents a non-linearity. In this region, the influencing quantity which influences the deflection is preferably modulated sinusoidally. This will result in a first modulation product which, because of the non-linearity, has twice the modulation frequency, and in a further modulation product which, because of the linear extension of the adjacent M3 curve, has the same frequency as the modulation voltage. With respect to their frequency and/or their phase relationship, the two voltages can be compared to the modulation frequency so as to separate them from each other. In this manner, the M4 signal can be effectively separated from the influences of the adjacent M3 signal.

The leak rate measuring device of the invention can be utilized in various manners:

1. The measurement object (the container) is evacuated. Helium is sprayed on from the outside. The gas sucked from the container is examined for traces of helium. In doing so, time will be gained by performing the measurement as provided by the invention.

2. The measurement object is arranged in a large recipient which is emptied by pumping. The measurement object is then filled with helium. In doing so, time is gained because, after e.g. about 3 minutes instead of the usual 10 minutes, a useful quantitative statement can be made on possible leaks. (The actual periods will depend on the volume.)

3. The measurement object is arranged in a large recipient and already contains helium. The recipient is evacuated. Also here, time is gained since a useful quantitative statement on possible leaks can be made at an earlier point (after e.g. 3 minutes). In this case, however, the measurement can be performed with higher accuracy because one has no possibility to determine the zero point. (The helium cannot be "switched off"). Without the measurement arrangement of the invention, one has no possibility to distinguish the helium from the residual water.

The invention allows for a very sensitive leak rate measurement wherein the leak indicator can be extended to cover a range up to e.g. 1E-10 mbar liters/sec.

BRIEF DESCRIPTION OF THE DRAWINGS

An embodiment of the invention will be explained in greater detail hereunder with reference to the drawings.

DETAILED DESCRIPTION

Figure 1:
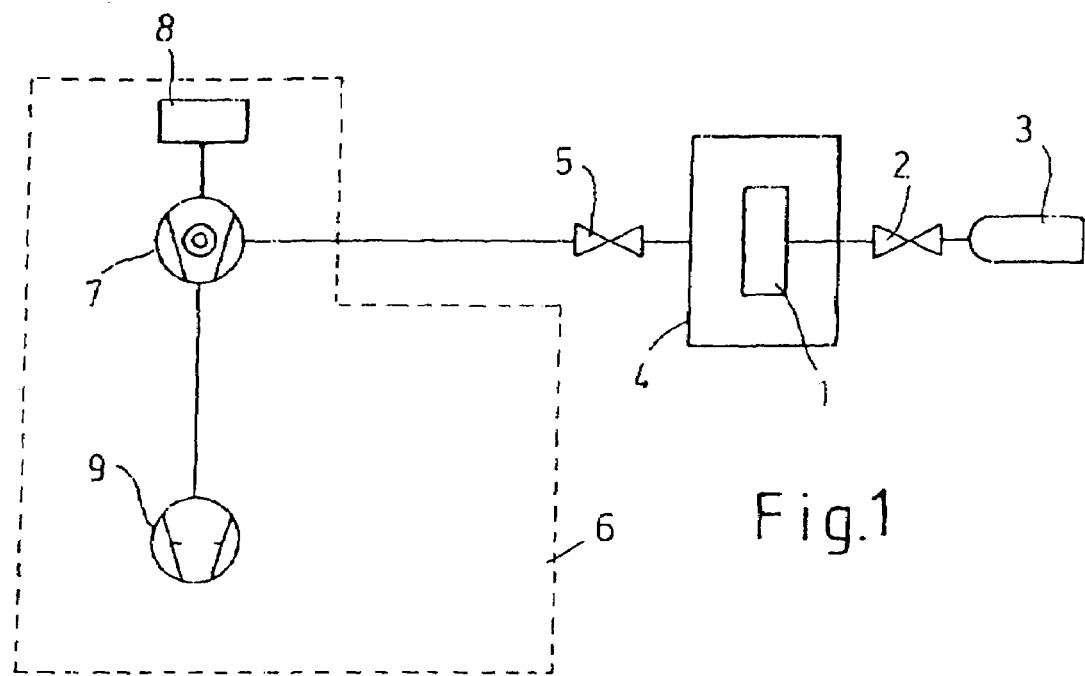
FIG. 1 illustrates the general configuration of the leak rate measuring device.

The general configuration of a leak rate measuring device according to the counterflow principle is illustrated in FIG. 1. A test sample 1 to be subjected to a leakage test is connected via a valve 2 to a test gas source 3 delivering helium. The test sample 1 is accommodated in a gas-tight test chamber 4. From test chamber 4, a conduit including a valve 5 extends to the test apparatus 6. This conduit is connected to a turbo molecular pump 7 having its entrance side connected to a mass spectrometer 8 and having its exit side connected to a forepump 9. Molecular pump 7 generates a high vacuum whereby helium which has entered the test chamber 4 through a leak of test sample 1, is sucked in. Internally of molecular pump 7, the helium, while flowing opposite to the conveying direction, will move into the mass spectrometer 8 in order to be identified.

Figure 2:
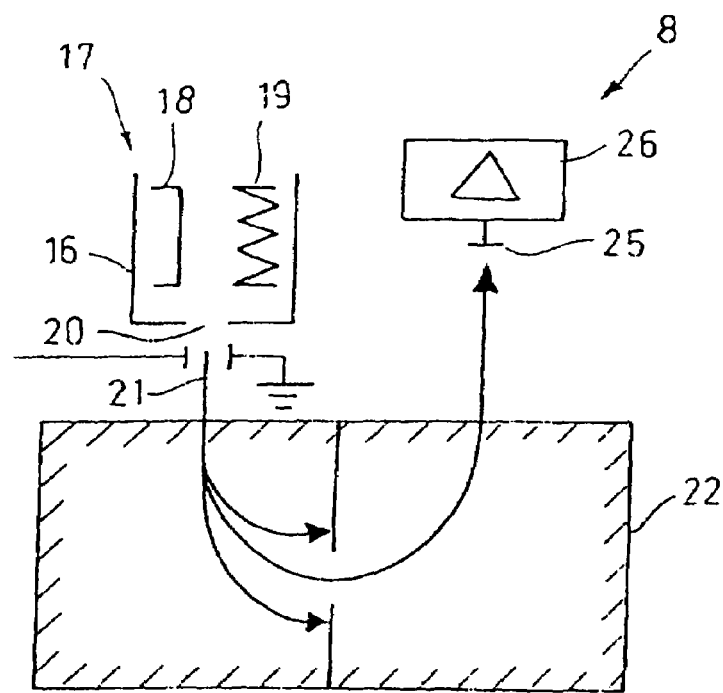
FIG. 2 shows a schematic representation of the function of the sector-field mass spectrometer.

The mass spectrometer 8 is a strip spectrometer, particularly a sector-field mass spectrometer as schematically illustrated in FIG. 2. The spectrometer comprises an ion source 17 with a cathode 18 and a heated anode 19. Ion source 17 is surrounded by a shield 16 with an aperture 20 formed therein for allowing an ion beam 21 to exit. Within a magnetic field 22, the ion beam 21 is deflected. The deflected ion beam impinges onto an ion catcher 25 connected to a highly sensitive electrometer amplifier 26. This amplifier will amplify the very small ion current. Normally, amplifier 26 is a DC amplifier arranged to operate up to the femto-ampere region ($10^{-15}$ A).

Figure 3:
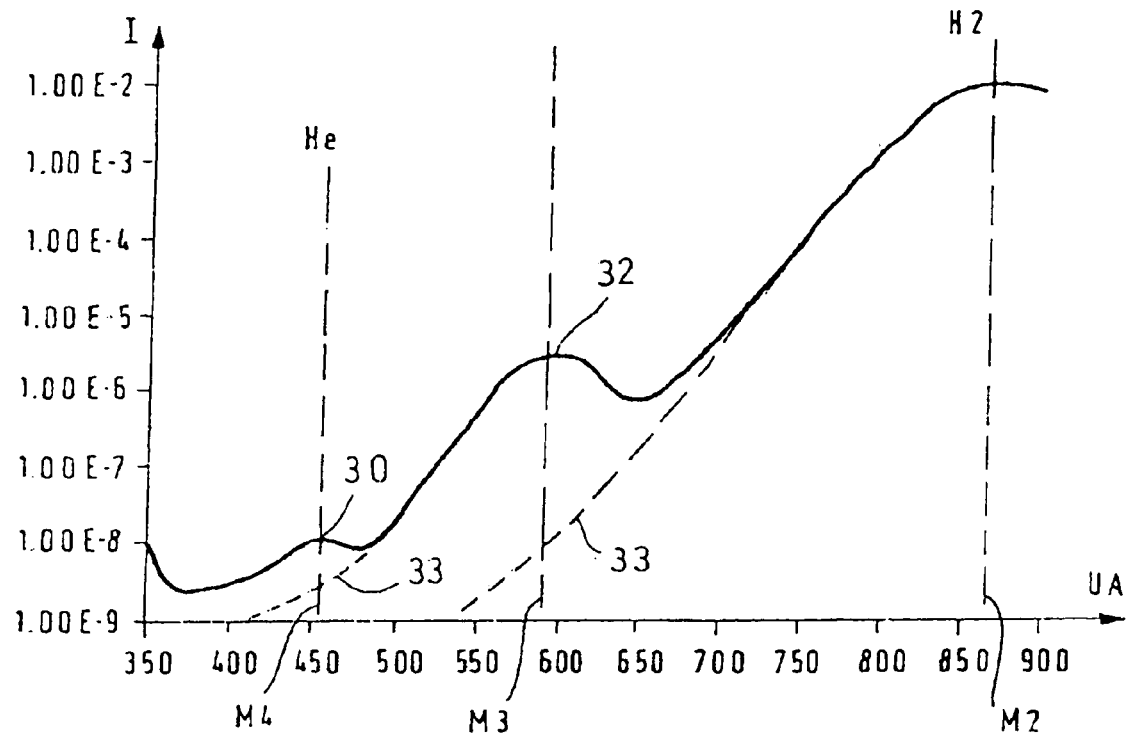
FIG. 3 shows a characteristic development of a scan of the anode voltage represented by the signal curve provided by the mass spectrometer.

The configuration of mass spectrometer 8 as described so far is already known. Using such a mass spectrometer in the measurement arrangement shown in FIG. 1, one will obtain e.g. the curve shown in FIG. 1 when performing a scan across the anode voltage. In FIG. 3, the anode voltage is represented along the abscissa, and the current I measured by amplifier 26 is represented along the ordinate. In this Figure, E-2 denotes $10^{-2}$, E-8 denotes $10^{-8}$, etc.

When the anode voltage $U_A$ of anode 19 is continuously increased, ions with a respective different specific mass will reach the ion catcher 25 via the provided ion path 21. Helium has the mass M4. Thus, on the site corresponding to mass M4; a peak 30 is generated, with its amount depending on the quantity of the detected helium.

At the anode voltage corresponding to the specific mass M3, a peak 32 is generated which is much higher than peak 30. Peak 32 is to be attributed to the presence of water ($H_2O$). Therefrom, $H_2$ ions are generated which include a portion of the specific mass M3. As long as water exists in the test chamber 4, the peaks of the masses 3 (32) and 2 dominate the whole diagram.

The sector-field mass spectrometer 8 has a limited selectivity. This means that the peaks 30 and 32 are not very narrow but do have a certain width. Peak 32 has extensions 33, in FIG. 3 marked by interrupted lines, which extend into the region of mass M4 and overlap with the helium component. This causes the already mentioned water underground. The influences of the very strong components M2 and M3 influence the component M4 and adulterate the height of the component.

In FIG. 6, the leak rate, which has been obtained from the current I measured by amplifier 26, is represented in logarithmic scale along the ordinate, and the pumping time t in seconds is represented, likewise in logarithmic scale, along the abscissa. The measurement was performed at the specific mass M4. The part 35 of the curve represents the case wherein the anode voltage $U_a$ is kept constant in the usual manner and the leak rate is calculated from the DC current. The curve 36 represents the case wherein the anode voltage is modulated and the leak rate is calculated from a frequency component (twice the modulation frequency) of the current. The curve 35 shows the water effect beginning at a leak rate of about $1 \times 10^{-8}$ mbar l /sec. and then decreasing due to the vanishing of the water. Underlying the water effect is a flat course of the signal represented by curve 36 in the range of several $10^{-10}$ mbar liters/sec.

The evaluation of the sole frequency component eliminates the M3 and M2 extensions and thus the slow drift of curve 35. While the desired useful signal would normally be available only after about 5,000 seconds, it is now obtained already after about 200 seconds. This results in a considerable reduction of the measurement time. The slowly vanishing influence of the M3 component, i.e. the water component, is eliminated.

For filtering out the M4 component, an influencing parameter of the mass spectrometer—e.g. the anode voltage—exerting an influence on the deflection, is modulated with a periodic modulation voltage $U_M$. The modulation voltage $U_M$ is a sinusoidal voltage having a relatively low modulation frequency in the range of e.g. about 1 Hz. The modulation voltage $U_M$ is used to modulate the anode voltage in the peak 30 (FIG. 4) so that the modulation voltage $U_M$ periodically follows the curved course 37 shown in scaled-up representation in FIG. 4. In the region of the modulation voltage, the extension 33 of the influence of mass M3 takes a substantially linear course 38.

The curved course 37 forms a non-linearity to the effect that the modulation voltage $U_M$ will cause a signal 40 to be generated with the frequency $2 f_M$, i.e. twice the frequency of the modulation signal. The course 38, on the other hand, will result in a signal 41 having a frequency and a phase relationship corresponding to those of the modulation signal.

For separating the mutually overlying signals 40 and 41 existing across amplifier 26, the signals are supplied e.g. to a lock-in amplifier which receives the modulation signal $U_M$ as a reference signal. The lock-in amplifier is a phase-selective amplifier which will separate the signals 40 and 41 from each other. In this manner, the signal 40 which has been generated exclusively under the influence of mass M4, can be selected. Thus, the influence of the water underground is eliminated.

Figure 4:
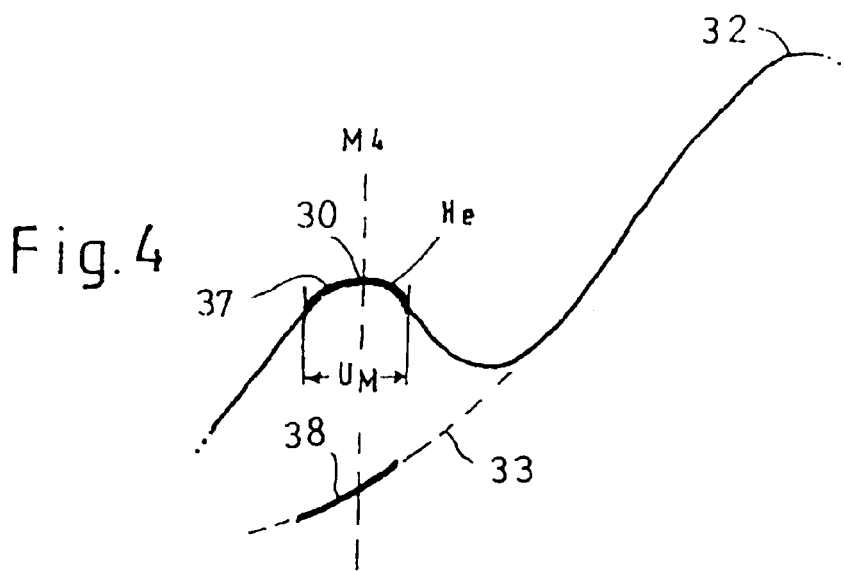
FIG. 4 shows the essential part of the function development according to FIG. 3, subdivided by function portions of the mass M3 and the mass M4, FIG. 5 show representations of the modulation voltage of the mass spectrometer and the resulting signal voltages for the mass M4 and the mass M3, and FIG. 6 show the developments over time of the influence of water and helium on the measurement result.

The method described with reference to FIGS. 4 and 5 is applicable both for the case that the amplifier 26 is an AC amplifier and the case that this amplifier is a DC amplifier. By the phase selection of signal 40, also the DC portion and other offset effects are eliminated.

The invention claimed is:

1. A method for leak rate measurement of a gas to be detected having a specific molecular mass, performed by use of a mass spectrometer arranged for mass-dependent deflection of gas ions, said method comprising the steps of:
    measuring a current generated by the ions impinging on an ion catcher of the mass spectrometer;
    evaluating a current signal corresponding to the respective current intensity;
    superposing the current signal corresponding to a specific mass with current signals of adjacent masses; and
    modulating at least one influencing quantity of the mass spectrometer influencing the deflection about a point of highest sensitivity for the mass thereby to be detected, in order to separate the current signal of the mass to be detected from the current signal of the adjacent masses by evaluating at least one frequency portion, wherein the modulation depth is restricted to the peak region of a current signal in which the extension of the influence of adjacent masses has a substantially linear course.

2. The method according to claim 1, wherein the modulating step is performed periodically wherein a filter means extracts from the generated current signal a measurement signal having twice the frequency of the modulation quantity for evaluation.

3. The method according to claim 1, including the step of terminating said modulating step when the portion of the spectrum caused by a deviating mass number has decreased to a predetermined value.

4. A leak rate measurement device comprising:
    a vacuum pump means for pumping off gas; and
    a mass spectrometer arranged for mass-dependent deflection of ions of the gas and for determination of the quantity of ions impinging on an ion catcher by use of an amplifier connected to the ion catcher, wherein in a selected measurement range corresponding to the peak of the mass spectrum occurring at a mass number, a periodically varying modulation quantity ($U_M$) is applied, said device further including filter means for extracting from the generated signal a measurement signal having the twice the frequency of the modulation quantity ($U_M$) for evaluation, wherein the selected measurement range is restricted to a region around the peak corresponding to said mass number in which the extension of the influence of adjacent masses has a substantially linear course.

5. The leak rate measurement device according to claim 4, wherein the modulation is terminated when the portion of the spectrum caused by a deviating mass number has decreased to a predetermined value.

6. The leak rate measurement device according to claim 4, wherein said filter means is a lock-in amplifier receiving the modulation signal ($U_M$) as a reference signal.

* * * * *